United States Patent Office 3,667,706
Patented June 6, 1972

3,667,706
ANTIVIBRATORY DEVICES WITH PHASE REVERSAL
Pierre Tiberghien, Billancourt, France, assignor to Regie Nationale des Usines Renault & Automobiles Peugeot, Billancourt, Hauts-de-Seine, and Paris, France
Filed June 22, 1970, Ser. No. 48,175
Claims priority, application France, July 25, 1969, 6925512
Int. Cl. F16f 15/00
U.S. Cl. 248—9
6 Claims

ABSTRACT OF THE DISCLOSURE

Device for damping out a vibration generated by an engine and transmitted directly to the frame structure or chassis through elastic support means connecting the engine to said frame structure or chassis, applicable notably to motor vehicles and machine tools, and adapted to introduce into the frame structure, as near as possible to said elastic support means, a second vibration of same modulus but of inverted phase in relation to the first vibration, through a bar resiliently connected both to the engine and to said frame structure and adapted to carry throughout its length an inertia weight displaceable therealong for adjustment purpose, characterized in that the terminal elastic elements connecting said bar to said engine and to said frame structure have anisotropic elastic properties depending on the stiffness values of the elements along two orthogonal axes substantially perpendicular to the bar axis.

---

The present invention relates to an antivibratory or vibration-damping device for engines and fixed or movable machines, which is applicable more particularly but not exclusively to motor vehicles.

This invention is concerned more specifically with a device for damping out a vibration generated by an engine or motor and transmitted directly to the surrounding frame structure or chassis through mounting blocks of elastic material which connect the engine to the frame or chassis, and is applicable more particularly to automotive vehicles and machine tools; this vibration damping device is designed for introducing into the frame structure, as close as possible to said engine mountings, a second vibration of same modulus but opposite phase with respect to the first vibration, through a bar resiliently connected to the engine and to the frame, said bar supporting throughout its length an inertia weight adapted to be set in a selected adjustment position.

It is known that the vibrations of an engine are transmitted to the chassis, frame or like engine-supporting structure through elastic engine mountings. Certain known devices are capable of damping out the vibration of this structure, notably the device described in the French Pat. No. 1,520,695, which corresponds to the type of device referred to hereinabove.

This device comprises a rigid bar connected through elastic means such as rubber pads or shoes or coil springs at one end to the engine and at the other end to the engine-supportnig chassis or frame structure through the medium of resilient supports such as rubber pads or shoes, coil springs, etc. It is characterized by an essentially unidirectional compressibility. The bar is weighted by an inertia weight rigid therewith. With this device it is possible to return to the chassis, in a predetermined direction, a dynamic force of the same modulus but opposite phase with respect to that introduced by the engine suspension. The setting and adjustment of the force thus introduced is achieved by shifting the weight so as to either properly select the bar inertia or adapting the stiffness to the single direction of operation of the previously selected resilient elements (rubber pads or shoes, coil springs, etc.). A proper balancing of the forces thus introduced requires that the point of application of the device to the chassis be as near as possible to the engine mounting or suspension.

This device, like other devices of the same character, provides a satisfactory operation in a specific direction. However, in most instances, it is highly desirable to reduce to zero the forces introduced into the strutcure along two perpendicular directions. In fact, in most machines and more particularly in internal combustion engines the force introduced into the structure does not keep the same direction at all times. As a rule, the structure is exposed to the action of a rotating force the characteristics of which depend not only on the vibratory movements of the engines, which are extremely complicated, but also on the specific properties of the engine suspension or elastic mountings. In all cases this force may be decomposed in two perpendicular directions.

It is the essential object of the device of the present invention to cancel or neutralize the two components of this force by resorting to an operation in two orthogonal directions. Thus, the force introduced into a predetermined plane, which may be referred to as the operating plane, will be cancelled completely.

The device of the type described in the above preamble is characterized, according to this invention, by the fact that the elastic elements located at the ends of the bar have anisotropic properties depending on the value of the stiffness of the elements along two orthogonal axes substantially prependicular to the bar axis.

This invention and the mode of operation of the means constituting the subject-matter thereof will be better understood from the following description of a typical form of embodiment thereof which is illustrated by way of example in the attached drawing, in which.

Figure 1:
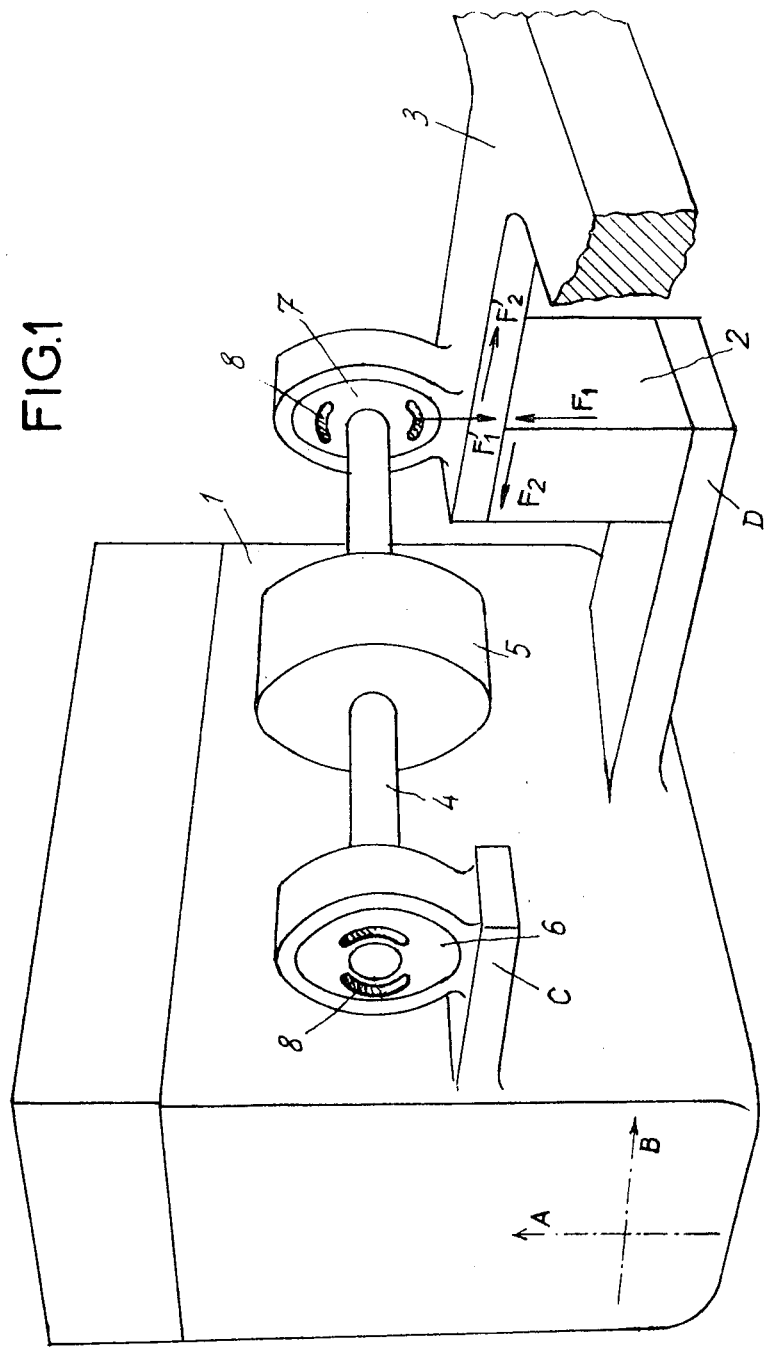
FIG. 1 is a perspective view of a vibration-damping device according to this invention, as applied to a motor vehicle.

One of the elastic mountings 2 (for example a rubber block) of the engine 1 bears on the frame or chassis 3. The engine 1 generates both vertical and transverse vibratory movements, therefore the frame 3 will be vibrated through this suspension with a force F having two orthogonal components $F_1$ and $F_2$. Force $F_1$ is directed in the direction A to compress the rubber block 2, and force $F_2$ is directed in the shearing direction B. The value and phase of each component force depend on the vertical and transverse vibrations of the engine, and also, of course, on the compression and shearing stiffness of the rubber material of these blocks. Thus, $F_1$ and $F_2$ are components in the directions A and B of the force F transmitted from the engine 1 to the frame or chassis 3.

The phase reversing device according to the present invention consists essentially of a bar 4 extending parallel to the longitudinal axis of the engine 1 and supporting an inertia weight 5 shiftable along this bar. The latter is secured at one point of the engine through a rubber sleeve 6 having a stiffness $k_1$ in the direction A and a stiffness $k_2$ in the direction B. The other end of bar 4 is secured to the frame or chassis 3 through another rubber sleeve 7 having a stiffness $k'_1$ and $k'_2$ in the same reference directions A and B, respectively, this last-mentioned sleeve 7 being located in close vicinity of the engine suspension block 2. The anisotropy of the rubber sleeves 6, 7 is obtained by forming apertures 8 therein.

The movements of bar 4 are such that a force F' having components $F'_1$ and $F'_2$ in the reference directions A and B is introduced through the elastic member 7 into the chassis 3.

Considering the vibrations developed at points C and D of the engine and assumed to be in phase, the inertia weight, the bar dimensions, the stiffnesses $k_1$ and $k'_1$ in the direction A may be selected to be such that the component $F'_1$ transmitted to the chassis 3 through the phase reversing device be of same modulus as, and in phase opposition with, the force $F_1$ introduced into the chassis 3 by the engine suspension 2 in the direction A.

Similarly, the stiffness values $k_2$ and $k'_2$ of sleeves 6 and 7 in the reference direction B may be so selected that the forces $F'_2$ and $F'_2$ in the same reference direction B be in phase opposition and of same modulus. The choice of rubber sleeves is not compulsory for these can be replaced by any other suitable system adapted to be assimilated in two orthogonal directions to a spring, for example resilient blades having a section such that the stiffness values in two perpendicular directions have the desired values, which in general differ according to each reference direction A or B.

At frequencies corresponding to said resonance frequencies, the vibration modulus may increase, instead of decreasing. As a rule, care is taken to place the highest resonance at frequencies where it is seldom attained or only at low intensity. On the other hand, the other resonance at a lower frequency may prove more detrimental. In order to eliminate the effect of this resonance without inasmuch affecting the efficiency of the system, the device of this invention has been completed with:

(1) A "beater" added to the inertia weight and tuned in the known fashion according to the following formula:

$$f = \frac{1}{2\pi}\sqrt{\frac{k}{M}}$$

wherein:

$f$ = resonance frequency of the beater,
$k$ = coefficient characteristic of the stiffness of the rubber constituting the sleeve 9,
$M$ = mass of the beater ring 10 at a frequency very close to the lowest resonance frequency of the device which it is desired to eliminate.

Figure 2:
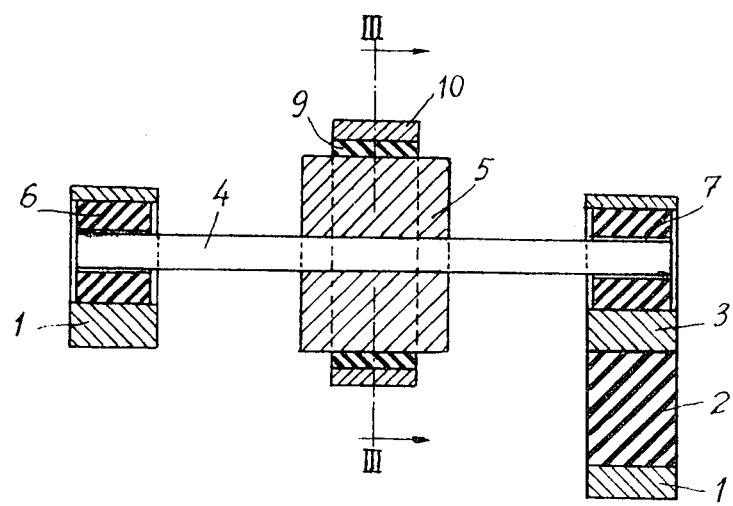
FIGS. 2 and 3 are sectional views of a modified form of embodiment of the structure illustrated in FIG. 1, namely a longitudinal axial section of the phase inverter and a cross section taken along the line III—III of FIG. 2, respectively.
Figure 3:
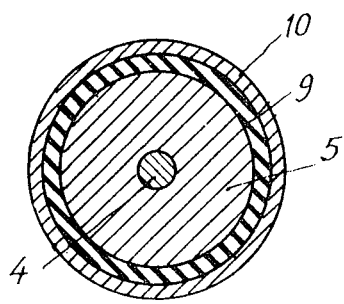

The mass or inertia weight 5 is surrounded by a rubber sleeve 9 acting as a spring means and by a metal ring 10 constituting the beater (FIGS. 2 and 3). The resonator thus constructed affords a satisfactory attenuation of the low resonance frequency without impairing the efficiency of the phase reversing device constituting the primary object of this invention, at frequencies higher than said resonance frequency.

Moreover, the rubber sleeve 9, like sleeves 6 and 7, may have an anisotropic structure so that two resonances can be attenuated in two operating directions by using the same beater.

(2) In case the sleeves 6 and 7 were replaced by resilient blades, a sandwich assembly comprising flexible metal blades separated by resin layers having vibration absorbing characteristics corresponding to the attenuation of the low resonance frequency is used.

If sleeves 6 and 7 of elastic material are used, the amplitude of the vibration corresponding to the low resonance frequency of the phase reversing device is obtained by utilizing a rubber composition known per se which comprises fillers capable of producing the maximum damping action in the frequency range concerned.

(3) An electromagnetic, pneumatic or mechanical device for locking the bar 4 when the engine speed is less than to a predetermined threshold.

Means may be provided for discontinuing this locking action when said engine speed threshold, whereat the phase inverter becomes resonant, is overstepped. Beyond this limit, the phase inverter operates normally. This locking action may be controlled automatically from any engine component of which the condition varies with the r.p.m. value.

However, the above description is given by way of example only and should not be construed as limiting the field of the invention; on the other hand, the position of the device may be changed without departing from the basic principle of the invention. In fact, this position is subordinate only to the plane in which it is desired to damp out vibration. Moreover, the number of such devices may correspond to the number of suspension devices or mountings utilized. Besides, the elastic elements may differ from those proposed and described herein, since they can also consist of elastic pads or blocks receiving shearing stresses in two different directions.

The device according to the present invention improves considerably the attenuation or damping of engine vibration in comparison with other similar devices, notably the device described in the patent cited above designed for damping out vibration only in a well-defined direction. In contrast thereto, the present invention is capable of damping out vibration in a well-defined plane, due to its bi-directional mode of operation.

What is claimed is:

1. Apparatus for damping out a first vibration generated by an engine, comprising, in combination: an engine frame; elastic support means connecting said engine to said frame; and means for generating a second vibration having substantially the same modulus as said first vibration and phase-inverted with respect thereto, said generating means comprising: a bar member; an inertia weight member mounted on said bar member and axially adjustable therealong; and means resiliently connecting said bar member to said engine and said frame, said resilient connecting means comprising elastomeric sleeve members disposed concentrically on said bar member and having anisotropic elastic properties which depend on the stiffness values of said sleeve members along two orthogonal axes substantially perpendicular to the axis of said bar member, said sleeve members having cavities formed therein in at least one plane containing the axis of said bar member to adjust the anisotropic elastic properties of said sleeve members such that for each component of said first vibration there corresponds a component of said second vibration which has the same modulus as, and phase-inverted with respect to, said first vibration.

2. Apparatus for damping out a first vibration generated by an engine, comprising: an engine frame; elastic support means connecting said engine to said frame; and means for generating a second vibration having substantially the same modulus as said first vibration and phase-inverted with respect thereto, said generating means comprising: a bar member; an inertia weight member mounted on said bar member and axially adjustable therealong; and means resiliently connecting said bar member to said engine and said frame, said resilient connecting means including blades having anisotropic elastic properties which depend on the stiffness values of said blades along two orthogonal axes substantially perpendicular to the axis of said bar member, said blades having such cross-sections that the stiffness values along said orthogonal axes differ from each other.

3. Apparatus for damping out a first vibration generated by an engine, comprising:
an engine frame;
elastic support means connecting said engine to said frame;
means for generating a second vibration having substantially the same modulus as said first vibration and phase-inverted with respect thereto, said generating means comprising:
a bar member;
an inertia weight member mounted on said bar member and axially adjustable therealong;
and means resiliently connecting said bar member to said engine and said frame, said resilient connecting means having anisotropic elastic properties which depend on the stiffnes values of said resilient connecting means along two orthrogonal axes substantially perpendicular to the axis of said bar member; and
means for attenuating the inherent resonance of said bar member and of said inertia weight member, said attenuation means comprising a beater in the form of a further sleeve member having a ring-shaped weight fitted thereon and tuned to the frequency to be damped out.

4. The apparatus according to claim 3, wherein said further sleeve member has weaker zones in at least one plane containing one of its diameters.

5. The apparatus according to claim 1, further comprising means for attenuating the inherent resonance of said bar member and of said inertia weight member, said attenuation means comprising said sleeve members which contain a rubber compositon containing fillers to reduce the amplitude of vibrations transmitted through said sleeve members at the resonance frequencies of said bar member and of said inertia weight member.

6. The apparatus according to claim 2, wherein said blades comprise a plurality of superposed metal blades separated by layers of a resin having vibration damping properties at the inherent resonance frequencies of said bar member and said inertia weight member.

References Cited

UNITED STATES PATENTS

| | | | |
|---|---|---|---|
| 2,178,077 | 10/1939 | Loftis | 248—358 |
| 3,415,470 | 12/1968 | Woodford et al. | 248—5 |
| 3,168,270 | 2/1965 | Bligard et al. | 248—5 |
| 1,973,510 | 9/1934 | Schieferstein | 188—1 BX |
| 2,838,137 | 6/1958 | Wallerstein | 188—1 B |

FOREIGN PATENTS

| | | | |
|---|---|---|---|
| 1,520,695 | 3/1967 | France | 248—15 |

J. FRANKLIN FOSS, Primary Examiner

U.S. Cl. X.R.

123—192 R; 188—1 B